(12) United States Patent
Klesadt et al.

(10) Patent No.: US 6,588,699 B2
(45) Date of Patent: Jul. 8, 2003

(54) RADAR-GUIDED MISSILE PROGRAMMABLE DIGITAL PREDETECTION SIGNAL PROCESSOR

(75) Inventors: Ingrid H. Klesadt, Tucson, AZ (US); William D. Cassabaum, Tucson, AZ (US); Brian L. Hallse, Orange, CA (US); Stephen J. English, Tucson, AZ (US); Richard L. Woolley, deceased, late of Tucson, AZ (US); by Charlene Woolley, successor trustee, Kearney, NE (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/108,477

(22) Filed: Mar. 27, 2002

(65) Prior Publication Data

US 2003/0075641 A1 Apr. 24, 2003

Related U.S. Application Data

(60) Provisional application No. 60/281,214, filed on Apr. 3, 2001.

(51) Int. Cl.$^7$ ................................................ F42B 15/01
(52) U.S. Cl. ........................................ 244/3.19; 342/62
(58) Field of Search ................................ 244/3.11, 3.12, 244/3.13, 3.14, 3.19, 3.15; 342/62

(56) References Cited

U.S. PATENT DOCUMENTS

| | | | | |
|---|---|---|---|---|
| 5,430,445 | A | * | 7/1995 | Peregrim et al. .............. 342/25 |
| 5,606,324 | A | * | 2/1997 | Justice et al. .................. 342/62 |
| 2002/0190892 | A1 | * | 12/2002 | Hallse .......................... 342/62 |

* cited by examiner

Primary Examiner—Peter M. Poon
Assistant Examiner—Timothy D. Collins
(74) Attorney, Agent, or Firm—Renner, Otto, Boisselle & Sklar (57) ABSTRACT

A digital predetection signal processor having a main channel processor, a dual path processor and at least two digital filters for filtering digital guidance signals before the signals are input into the main channel and dual processing path processors. The digital filters are each programmable to digitally filter the digital guidance signals to thereby minimize output signal error. The processor further includes a circuit for performing base 10 logarithmic calculations of a binary signal in a digital system for optimizing accuracy of the calculation, and a priority encoder for determining a most significant bit position of the binary number, with the most significant bit representing a base 2 logarithmic integer component of the input binary signal.

7 Claims, 5 Drawing Sheets

RADAR-GUIDED MISSILE PROGRAMMABLE DIGITAL PREDETECTION SIGNAL PROCESSOR

RELATED APPLICATION

This application claims priority under 35 U.S.C. §119(e) to U.S. Provisional Patent Application Serial No. 60/281,214 filed on Apr. 3, 2001. The entire disclosure of the above identified provisional application is hereby incorporated by this reference.

BACKGROUND OF THE INVENTION

1. Technical Field

The present invention relates generally to radar processing systems, and, more particularly, to a missile digital radar-guided predetection signal processor implemented in a single monolithic package that increases the accuracy of a missile-based guidance system.

2. Discussion

Radar-based guidance systems greatly increase the probability of a missile successfully finding its intended target. In a conventional system, processing circuitry implemented within the missile itself detects a signal from the intended target and steps down the signal to a frequency level that is acceptable for processing. The stepped down signal is then filtered and converted into digital form by an analog-to-digital converter. A predetection signal processor then conditions the digital signal for further processing where range and rate information of the intended target is calculated. Such a radar based guidance system effectively filters and otherwise conditions the target signal to prevent the missile from being set off course by noise or other peripheral signals.

While the above radar processing system enhances missile system accuracy, a need exists for further advancement in the art. In particular, in conventional missile based radar guidance systems, analog components are typically used to implement a large part of the missile predetection signal processor. However, increasing technological advancements and present design parameters dictate that more components be implemented within ever decreasing dimensions. As an analog based predetection processor has a relatively large associated footprint, such a processor consumes a relatively large amount of board space and thus limits system design.

Also, the above analog based processor has relatively inflexible performance characteristics. Although analog components provide acceptable performance within a given range, such components are not programmable and thus must be actually physically replaced if the processor parameters change or as guidance parameters vary.

In addition, analog component accuracy often varies due to fluctuations in temperature or other surrounding conditions. Such component variation, although typically minuscule, could greatly affect the missile target course. Also, such a predetection signal processor typically processes signals on two separate channels. Analog component variation can thus affect the output signal from each channel, thus causing channel-to-channel signal variation.

In the above-described systems, many signal processing applications in the missile predetection signal processor require the implementation of a base 10 logarithmic function for processor computations. In a digitally based processing system, one of the more basic calculation methods utilizes a look-up table. Depending upon the size of the number, the logarithmic look-up table can become quite large and thus consume a large amount of board space or application specific integrated circuit (ASIC) area, and thus become a significant design problem given today's design parameters requiring small circuit footprints.

What is needed then is a digital predetection signal processor implemented in a radar guided missile that minimizes board space required for implementation and that improves the accuracy of the missile in which it is implemented.

What is also needed is a digitally implemented system for computing the base 10 logarithm of numbers generated by a digital signal processing application that minimizes board space consumed and which increases system computational accuracy.

SUMMARY OF THE INVENTION

In accordance with the teachings of the present invention, a digital predetection signal processor implemented in a radar guided missile is provided for properly preconditioning the signal return to more accurately estimate the range and rate of its intended target. The digital predetection signal processor of the present invention also minimizes the amount of board space taken and thus finds particular utility in present applications having rigid board space requirements. The processing system includes an analog guidance signal detector and an analog-to-digital converter for converting analog guidance signals from the analog guidance signal detector to digital guidance signals and outputting the digital guidance signal on at least two channels. A digital predetection signal processor system coupled to both the channels includes a main channel processor and a dual path processor, each of which contains at least two digital filters for filtering the digital guidance signals before the signals are input into the main channel and dual processing path processors, respectively. The digital filters are programmable to digitally filter the digital guidance signals to thereby minimize output signal error. The main channel processor and the dual processing path processor each utilize the same input guidance signals for processing purposes.

In addition, a system is provided for computing the base 10 logarithmic value of binary signals generated by the above described predetection system processor. The logarithmic converter system finds utility not only in the above-mentioned missile based signal processing application, but more generally in any application requiring calculation of a base 10 logarithm of a binary number. The logarithmic converter is implemented through a circuit comprising a priority encoder for determining a most significant bit position of the binary number, with the most significant bit representing a base 2 logarithmic integer component of the input binary signal. A decimal selector selects a predetermined number of bits to follow the base 2 logarithmic integer component determined by the priority encoder, with the predetermined number of bits representing a base 2 logarithmic fractional component following the integer component of the input binary signal. An adder combines the integer component with the fractional component to thereby output a base 2 logarithmic value of the input binary signal. A multiplier divides the base 2 logarithmic value of the input binary signal by a base 2 logarithmic value of 10 to thereby output a base 10 logarithmic value of the input binary signal.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
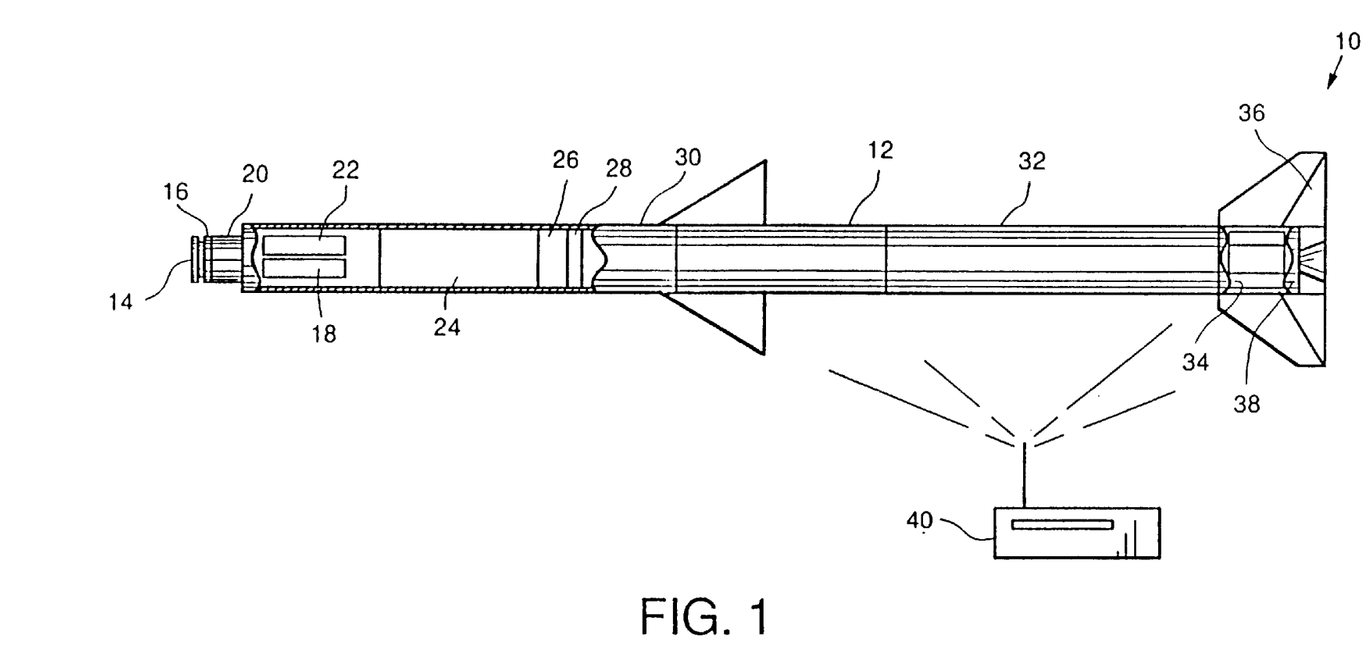
FIG. 1 is a side elevational view in partial cross-section of a missile in which the present invention is implemented.

Referring to FIG. 1, an elevational view of a missile which the preferred embodiments of the present invention are implemented as shown generally at 10, with portions of its outer housing 12 partially cut away to reveal the inner components thereof. The missile includes an antenna 14 that sends and receives radio frequency (RF) signals for target detection purposes. A radio frequency (RF) processor 16 receives and processes target detection signals transmitted by a signal transmitter 18 through the antenna 14 and reflected off of an intended target (not shown). A missile seeker/servo 20 maneuvers the antenna to maintain the antenna in correct target detection position. A battery pack 22 provides power to all missile components. A missile system guidance electronics unit 24 is located aft of the seeker/servo and digitally performs numerous system calculations in a manner that increases the probability of the missile successfully finding its intended target and in a manner that minimizes requisite circuit board space as will be described below.

An inertial reference unit 26 is located aft of the guidance electronics for providing the guidance electronics with reference signals to enable the electronics to determine missile location with respect to its originating position. A target detection device processor 28 includes separate antennas and gimbal mounted gyro units (not shown), and effectively takes over guidance of the missile once the missile is within a predetermined range of its intended target. A missile armament 30 is located aft of the target detection device processor 28 and in front of a rocket motor 32. An actuator 34 located aft of the rocket motor 32 controls the steering of the rocket through manipulation of rocket fins 36 in response to guidance signals from the guidance electronics 24. A data link 38 receives missile steering and control related signals from a control unit 40 located remotely from the missile, and typically in an aircraft, for operatively guiding the missile toward its intended target.

Figure 2:
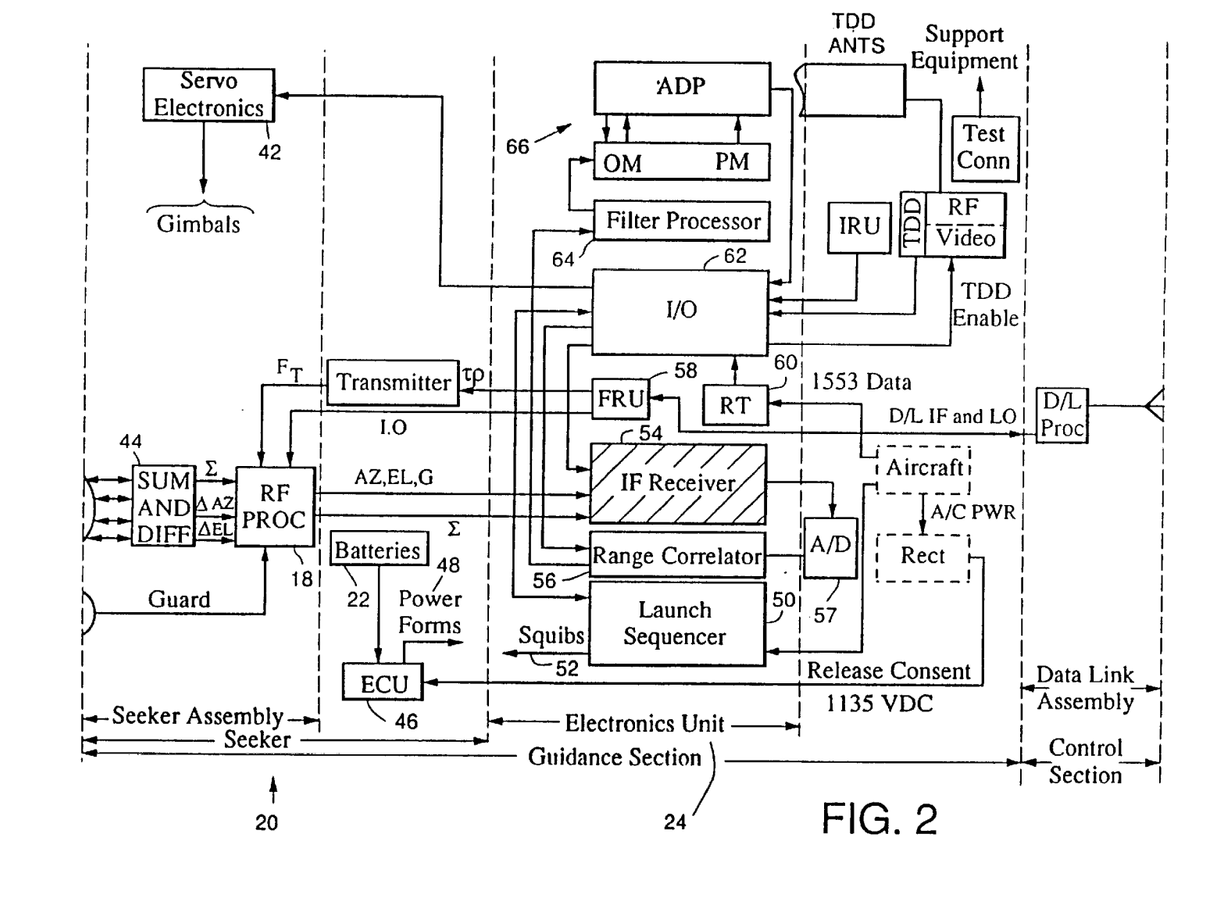
FIG. 2 is a block diagram of the electronics of the missile of FIG. 1.

Referring specifically to the radar system block diagram in FIG. 2, the seeker/servo assembly 20 further includes servo electronics 42, which are the electronics which control movement of the gimbal mounted servo, and thus the movement of the missile antenna 14. In addition, the seeker/servo assembly 20 also includes a sum and difference processor 44 that receives input from the antenna and provides azimuth, elevation and sum signals to the RF processor 16.

The intermediate frequency (IF) receiver 54 receives azimuth, elevation, guard and summation signals from the RF processor 16 and performs signal processing functions, such as inphase and quadrature detection functions and automatic gain control amplification. Subsequent to performing the inphase and quadrature detection functions, the IF receiver filters and outputs inphase signals and quadrature signals on two channels. Channel 1 contains inphase I1 and quadrature Q1 values, while Channel 2 contains inphase I2 and quadrature Q2 values. The IF receiver 54 houses existing analog predetection processing functions as performed by present analog predetection processors. The range correlator 56 also performs calculations to determine the inflight distance of the missile from its intended target. The range correlator 56 also includes an analog to digital converter 57 and a digital predetection signal processor according to a preferred embodiment of the present invention, as will be described in more detail below.

Additionally, the electronics unit 24 includes a frequency reference unit (FRU) 58 that outputs requisite signal frequencies to various components throughout the missile. A remote terminal (RT) 60 operates as an interface between the control unit 40 and the missile before the missile is launched by the control unit through the launch sequencer 50. Located above the FRU 58 and the RT 60 in FIG. 2 is an input/output processor 62. The IO processor functions to route information to the various components within the missile according to the particular information needs of the components. Thus, missile control signals, including control signals regarding the implementation of the predetection processor of the present invention, emanate from the AMRAAM data processor (ADP).

A filter processor filters information received from the range correlator 56, including information output from the digital predetection processor of the present invention, before the data is input into the data processor 66, which is the central processing unit for the missile electronics unit.

Figure 3:
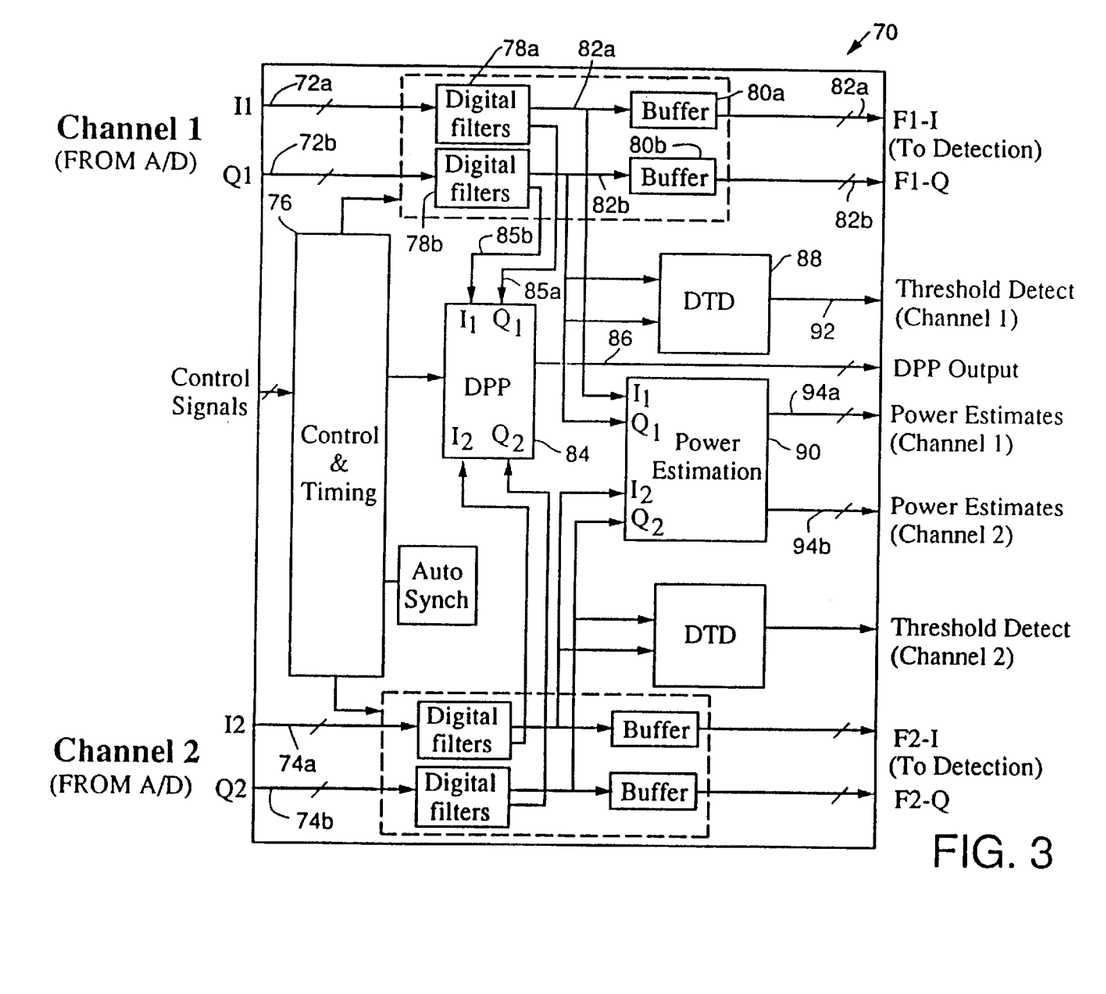
FIG. 3 is a block diagram of the electronics of a preferred embodiment of the present invention.

Referring now to FIG. 3, an integrated programmable dual channel digital predetection processor is shown generally at 70 according to a preferred embodiment of the present invention. The predetection processor 70 is implemented in the range correlator 56 prior to the correlation function, unlike prior conventional analog predetection processors, which were implemented in large part in the IF receiver 54. The predetection processor 70 filters the input signal subsequent to the signal being converted to a digital signal, unlike conventional analog filtering, thus minimizing error due to analog-based calculations. The predetection processor 70 is also integrated into a single monolithic package and thus occupies a smaller physical area than conventional predetection processors implemented with analog components. In addition, the predetection processor 70 of the present invention enhances overall system performance due to the elimination of inphase quadrature and channel to channel filter mismatches.

As shown in FIG. 3, the processor 70 receives Channel 1 inphase I1 and quadrature Q1 inputs from the analog to digital convertor 57, as indicated generally at 72a, 72b. Similarly, the processor receives Channel 2 inphase I2 and quadrature Q2 input signals from the analog to digital convertor, as indicated generally at 74a, 74b. For purposes of description of the structure and function of the predetection processor, reference will be made to Channel 1, with the understanding that the structure and function of components associated with Channel 2 is identical to those of Channel 1. The predetection processor 70 also receives control signals which are input from the input/output processor 62 into control and timing processor 76.

With reference now specifically to Channel 1, Channel 1 inputs are coupled to digital filters, indicated generally at

78a, 78b. The digital filters are finite impulse response (FIR) filters, which are programmable, matched filters having varying bandwidths, which are set by the filter coefficients (weights). The filters 78a, 78b are utilized using programmable weights up to 32 taps accompanied by decimation rates equal to the number of taps. The size of each of the filters is selectable in powers of 2 from 0 to 32, with the filter size 0 corresponding to a filter bypass mode. Filter output is fully digitally scalable with the external signal command output. The command output permits decimation rates of any size, provided the signal is sufficiently band limited. By being programmable, the FIR filter characteristics can be modified to more closely match particular channel characteristics. In addition, due to its programmability, the filter bandwidth may also be altered. Inphase quadrature and channel-to-channel filter mismatches prevalent in analog predetection processors are eliminated through the implementation of these digital filters.

According to one embodiment of the present invention, filter decimation rates may be set to half the number of taps if a filter staggered mode is preferred. In the staggered mode, filter windows are overlapped and decimation is done by half of the non-staggered number of taps.

Operation of the digital filters are controlled by the control and timing processor 76. The filters in turn are coupled to buffers 80a, 8b through filter Channel 1 outputs, indicated generally at 82a, 82b. The digital filters 78a, 78b are also coupled to a dual processing path processor (DPP) 84 through lines 85a, 85b. The dual processing path processor 84 is coupled to the control and timing processor 76 and includes a DPP output, indicated generally at 86.

Still referring to FIG. 3, operation of the predetection processor of the present invention will now be described. The signals input at Channel 1 are input into the digital filters 78a, 78b. Each of the filters is in reality two separate filters, with one filter filtering the output going to one of the main channel buffers 80a, 80b and the other filtering the output going to the DPP 84. Preferably, the main channel filter has programmable weights, while the DPP processor has programmable decimation and fixed weights. Thus, each filter 78a, 78b can provide two different types of filtering simultaneously for two different types of processing if necessary. The digital filter outputs are then input into the buffers 80a, 80b. The buffers receive the output signals from the digital filters and store the signals until a timing signal is received from the control and timing processor 76, which indicate that the stored signals should be output to the correlator 64 on lines 82a, 82b.

As indicated above, the signals input into the digital filters are separately filtered and also output to the DPP 84. The DPP utilizes these filtered signals in certain predetection processing functions, such as providing addition range and rate information unavailable in main channel processing. The DPP-computed values are then output at 86 in series, rather than in parallel as with the Channel 1 outputs 82a, 82b. This is done to reduce the pinout, and therefore footprint of the predetection processor.

The filtered signals output to buffers 80a, 80b are also output in parallel to the digital threshold detector 88. The digital threshold detector detects whether or not the input signals 72a, 72b are above a certain minimum level acceptable for system processing or if the input signal is just noise. The digital threshold detector output 92 is then input to the input/output processor 62 (FIG. 2), which then sends the DTD data to other system components requiring signal threshold level information.

In addition, the digital filters 78a, 78b are coupled to a digital threshold detector (DTD) 88 and a power estimator 90, with the DTD having an output 92, and the power estimator having outputs 94a, 94b. The signals filtered by the digital filters 78a, 78b and output to buffers 80a, 80b are also output to the power estimator 90. The power estimator 90 looks at signal energy level across a given period of time and estimates the power over that period of time in a manner well known to those skilled in the art. The power estimates for the Channel 1 signal are output at 94. The output is then input into the I/O processor 62 which then routes the power estimate information to components within the system needing such information for processing purposes.

Present predetection processors incorporate analog threshold detectors such as that shown at 88 and power estimators such as that shown at 90. However, in present predetection processors, each of these components is a separately-packaged component. Thus, conventional predetection processors are characterized by a footprint much larger than the footprint of the predetection processor of the present invention. In addition, conventional predetection processors implement a non-programmable DPP, such as the one shown at 84, with analog components and with separately-packaged analog-to-digital convertors. The predetection processor of the present invention combines the digital threshold detection and power estimation functions into a single monolithic package, thereby reducing the overall board space required for implementation of the present invention when compared to presently implemented systems. In addition, the predetection processor of the present invention also implements the digital dual path processor in the digital realm within the same package as all other digital signal components, thereby eliminating the need for separate analog-to-digital convertors and thus further reducing both board space required to implement the system and error inherent with analog components due to component drift caused by temperature fluctuations. The DTD 88 is programmable such that the threshold window may be moved in accordance with changing system parameters.

In addition, the power estimator 90, which determines AGC attack points, now is operable off of either system Channel 1 or Channel 2. The power estimator also allows collection of separate calibration and range gate information for each channel as well as allowing determination of peak signal per post detection integration (PDI) interval and an average per coherent processing integration interval (CPI), none of which is possible with conventional predetection processors. The input signal power is determined by peak signal power over a PDI interval for each channel. The average signal power is determined by the average envelope estimation over a CPI interval. From these two measurements, AGC attack points may be set by comparing the peak signal level to a programmable threshold, unless the receiver is saturated. The total number of saturated PRI's are counted over a CPI and the total number of saturations are counted per PDI. The thresholds used in saturation detection are programmable and on-board memory is provided for storage of all estimates including the calibration results.

Further, main channel (Channel 1 and Channel 2) and DPP processing functions are performed on the same digitized data, which reduces mismatch errors between the two processing functions. Prior art processors utilize separate DPP and main channel processing on different digitized data, thereby increasing the tendency for mismatch errors between the two processing functions.

It should be appreciated at this point that the predetection processor 70 of the present invention reduces physical area required for implementation when compared to prior pre-detection processors by as much as 96%. Such miniaturization is realized by the replacement as many as forty analog components with a single digital application specific integrated circuit (ASIC) in a monolithic package, thus leaving additional board space for implementation of additional signal processing functions.

Figure 4A:
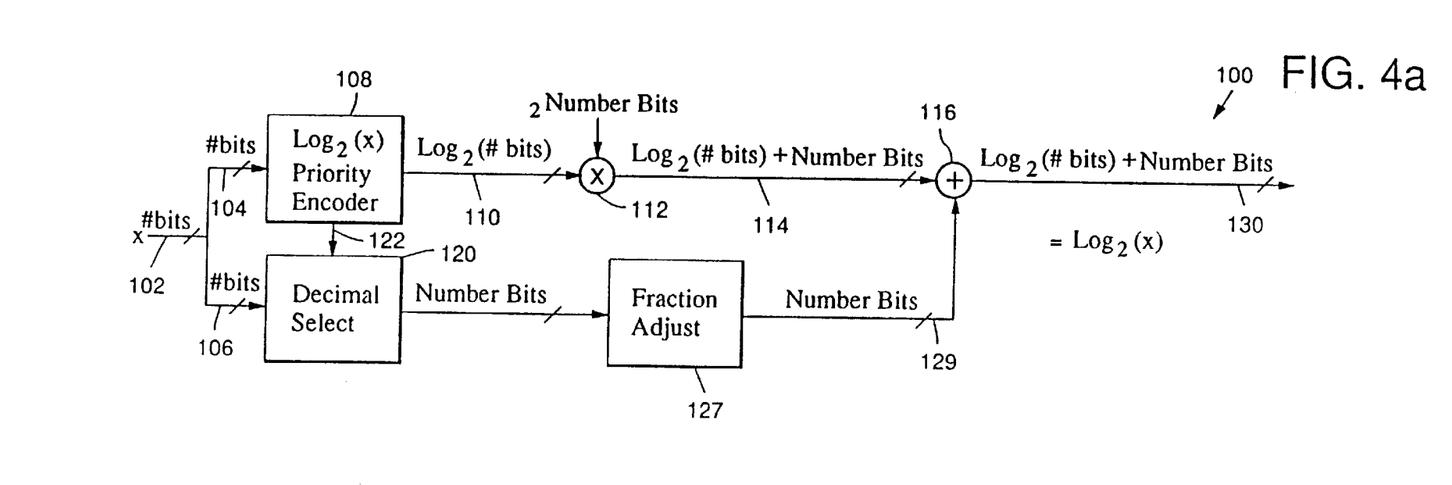
FIGS. 4a–4b are block diagrams of the hardware used to implement a second preferred embodiment of the present invention.
Figure 4B:
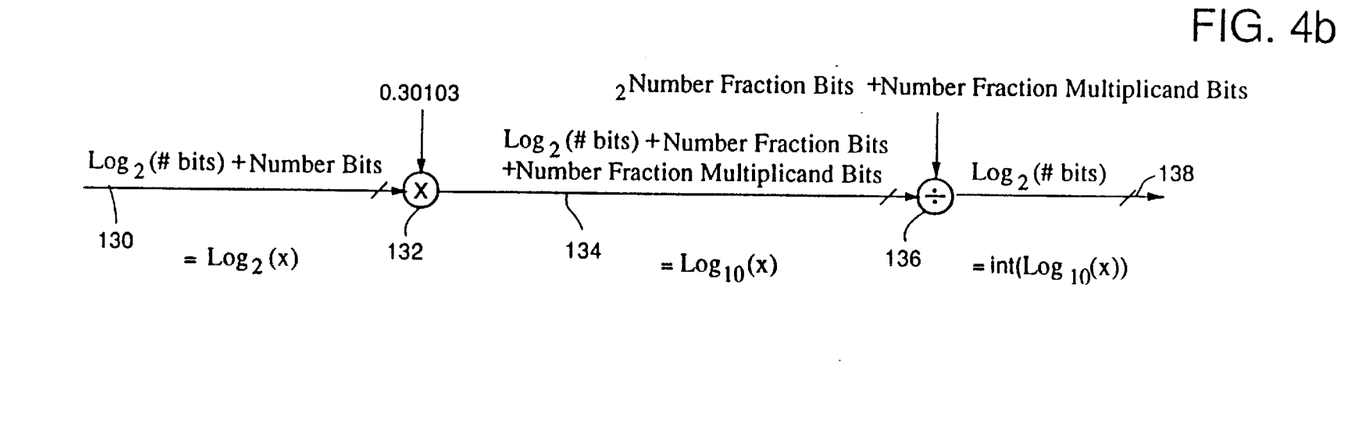

Turning now to FIGS. 4a–4b, a second preferred embodiment of the present invention is shown generally at 100. This preferred embodiment includes hardware implemented to digitally compute the base 10 logarithm of a digital input signal. It is contemplated that such circuitry may be implemented not only with the predetection processor 70 of the present invention, but may also be implemented in any number of digital systems in which the base 10 logarithm of a binary signal must be computed in the digital realm. Such systems include, but are not limited to, automatic gain control and power spectrum systems. It should also be appreciated that the embodiment shown at 100 may, in addition to being implemented with digital hardware components, also be implemented through a software based application.

Referring to the base 10 logarithm converter 100 shown in FIG. 4a, a binary signal is output from digital circuitry, such as the predetection processor 70 in FIG. 1, and is input at 102. As shown, the value for $\log_2(x)$, with x being the binary value of the input signal, is computed in two parts. The integer component of $\log_2(x)$ is computed using the binary input signal 104, while the fractional component of the $\log_2(x)$ is computed using the binary input signal 106.

Referring to the integer computing segment of the circuitry, a priority encoder 108 of the type well known in the computer art computes the integer component of $\log_2(x)$. The priority encoder 108 outputs at 110 a bit position corresponding to the highest non-zero component of the original input binary signal. To better illustrate the operation of the logarithm converter 100, reference is made to Table I below.

TABLE I

|  |  | Binary Value |
|---|---|---|
| Signal | 47822014 | 00000101101100110110100010111110 |
| Priority Encoder Value | 25 | 11001 |
| 5 Fractional Bits | 13 | 01101 |
| Fractional Value | 13 + 3 = 16/32 = 0.5 | .10000 |
| Log$_2$ (Signal) | Log$_2$(47822014) = 25.5 | 11001.10000 |
| Multiplicand Value | 20*0.30103 = 6.0206 = 24660/4096 | 110.000001010100 |
| Log$_{10}$ (Signal) | 24660/4096*25.5 = 153.522949219 | 10011001.10000101111000000 |
| Power Value | 20Log$_{10}$(Signal) = 153.592557245= 153 | 10011001 |

Thus, for a signal input at 102 corresponding to the number 47822014, the signal would be input at 102 as a corresponding binary signal shown in Column 3. The priority encoder determines that the twenty-fifth bit is the most significant non-zero bit and outputs the binary number 11001, corresponding to the binary value of the number 25. The priority encoder output 110 is then input into a bit shifter 112 that shifts the five bit binary number by a predetermined number of bits. This predetermined number of bits by which the priority encoder output 110 is shifted is set according to parameters described below in conjunction with the description of operation of the fractional calculations. For the illustrated case, five bits have been chosen. Thus, the five bit priority encoder output consists of the original five bit output plus five zeros representing the number of positions the original number is bit shifted. This 10 bit number is then output at 114 and input into the binary adder 116 as set forth in detail below.

Referring to the fractional computation segment of the circuitry, the input signal 106 is input into a decimal selector 120, along with an output 122 from the priority encoder 108. The output 122 is a signal representing the most significant bit calculation performed by the priority encoder 108. The decimal selector 120 subsequently selects a number of bits for the fractional component of the logarithmic value being computed corresponding to the number of bits by which the integer value computed by the priority encoder is shifted. The number of bits chosen at the decimal selector involves a tradeoff between output accuracy and actual area needed to implement the present invention. If a more accurate result is required, then the decimal selector is implemented to choose more bits. However, this added accuracy results in the use of more hardware components, such as gates in an ASIC, and thus a larger amount of board space, for system implementation. If an output having less accuracy is satisfactory, then fewer bits may be chosen, resulting in the system requiring fewer gates, and thus less board space for implementation.

Figure 5A:
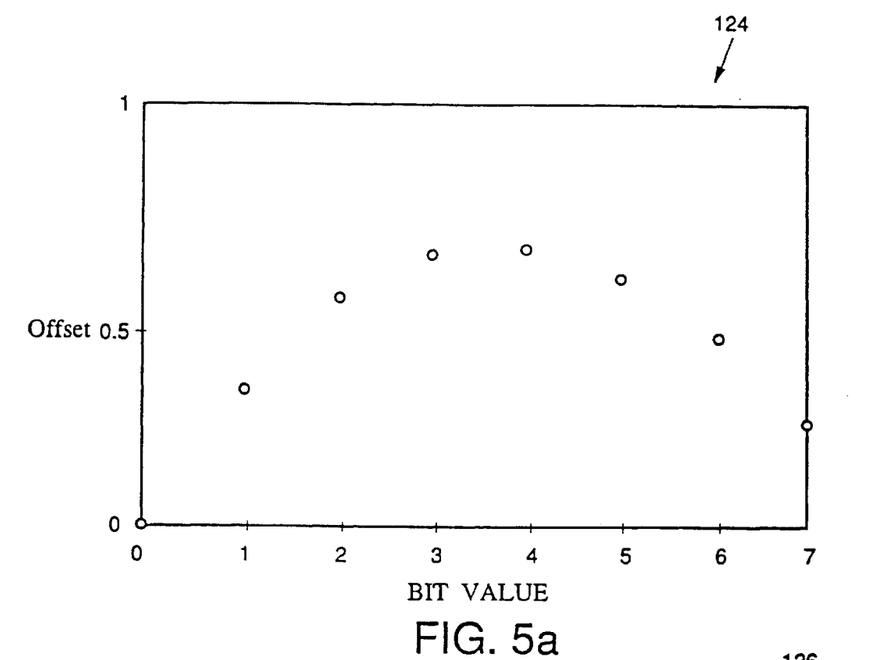
FIGS. 5a–5b are graphical representations of bit value versus offset used to determine specific implementation of the preferred embodiment of the present shown in FIG. 4.
Figure 5B:
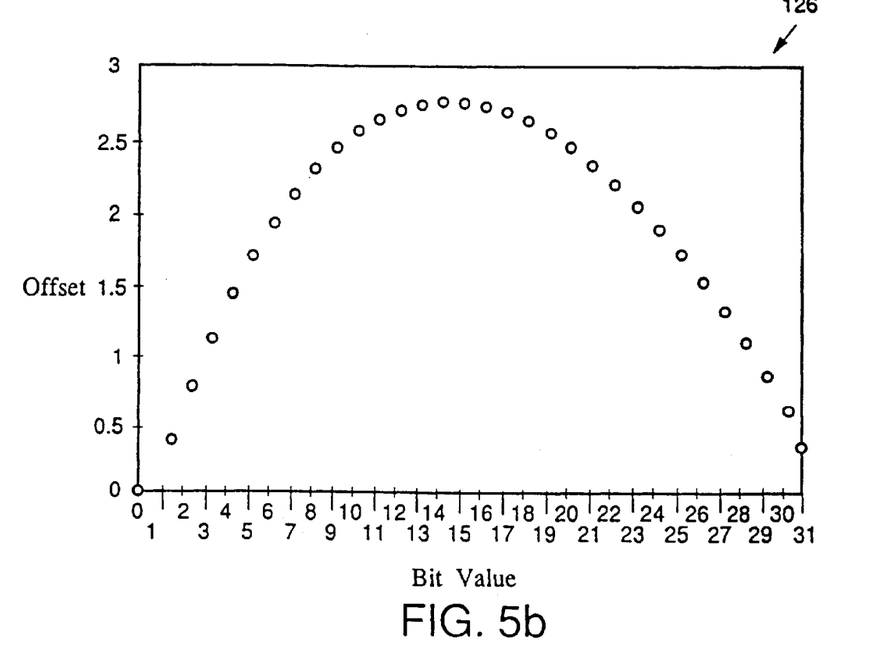

To compute the logarithmic value of the bits chosen, the value of the number of bits chosen is added to an offset value. As shown in FIGS. 5a and 5b, the offset, or correction, value is directly dependent upon the number of bits chosen. FIG. 5a shows at 124 the plot of bit value versus offset value when three fractional bits are chosen, while FIG. 5b shows at 126 the plot of bit value versus offset when five fractional bits are chosen for the calculations performed at the decimal selector 120. The offset values used are computed using the following equation:

$$\text{offset} = (\log_2(y) - \text{int}(\log_2(y))) * \text{MaxBitValue} - y$$

In the above offset equation, the max bit value equals 2 raised to the number of bits. The function 124 can be implemented using either adders in a comparator or through the use of a look-up table having an input corresponding to the number of bits chosen and an output corresponding to the input plus the respective offset value.

In the example corresponding to Table I, when five fractional bits are chosen, the five bits to the right of the most significant bit in the input signal are 01101, which represents the value 13. Referring to FIG. 5b, the offset value corresponding to the bit value 13 corresponds to an offset value of approximately 2.6. Because the value 2.6 can not be represented in the binary realm, the value must be rounded to the nearest whole integer, which in this case is 3. A fraction adjust 127 adds an offset of 3 to 13 and outputs at 129 a binary value of 16, or 10000. This five bit binary value replaces the five zeros used to shift the output 114, resulting in the $\log_2(x)$ being output at 130.

Referring to FIG. 4b, the output 130 is then input into multiplier 132. Multiplier 132 multiplies the $\log_2(x)$ by $1/\log_2(10)$, which has a value of 0.30103. The resulting output 134 is the $\log_{10}(x)$, as the $\log_2(x)/\log_2(10) = \log_{10}(x)$. The output 134 is then input into a divider 136 which divides out the fractional value of the $\log_{10}(x)$. Thus, referring to Table I, $\log_{10}$ (input signal)=153.592557245. The output divider 136 truncates the number such that the output at 138 has a whole integer value of 153. The divider 136 shifts out the number of fractional bits plus the number of multiplicand bits to output an integer value for the $\log_{10}(x)$. In the example corresponding to the values given in Table I, a total of seventeen bits are shifted out of the output 138 (twelve from the calculation performed at 132 and the five shift bits added at bit shifter 112). However, if further precise computations are required, the fractional bits may be kept rather than truncated at this point.

It should be appreciated that if the log result is to be multiplied by some other value, i.e., if a power estimation is to be performed where the equation is $$\text{power} = 20 \log_{10} \text{signal}$$

the initial multiplicand 0.30103 can be multiplied by the number 20, and the resulting value would then be used to convert to a base 10 logarithm at multiplier 132.

It should thus be appreciated that the logarithm converter of the present invention thus performs base 10 logarithm calculations on input digital signals through implementation of the above-described hardware components. Both the predetection processor and the logarithm converter of the present invention enhance missile guidance system accuracy and thus greatly increase the probability of a missile successfully hitting its intended target.

Various other advantages of the present invention will become apparent to those skilled in the art after having the benefit of studying the foregoing text and drawings, taken in conjunction with the following claims.

What is claimed is:

1. A missile-based guidance system, comprising:
   an analog guidance signal detector;
   an analog-to-digital converter for converting analog guidance signals from said analog guidance signal detector to digital guidance signals and outputting said digital guidance signals on first and second channels; and
   a digital predetection signal processor coupled to said first and second channels, including a main channel processor and a dual path processor for performing predetection calculations, said main channel processor and said dual path processor each including at least two digital filters each for filtering said digital guidance signals before said signals are input into said main channel processor and said dual path processor;
   said digital filters each being programmable to digitally filter said digital guidance signals to thereby minimize output signal error;
   said main channel processor and said dual path processor each utilizing common input guidance signals for predetection calculations.

2. The missile-based guidance system of claim 1, wherein said main channel processor comprises a digital threshold detector implemented on said first and second channels for detecting threshold signal levels of said digital guidance signals.

3. The missile-based guidance system of claim 1, wherein said main channel processor comprises a power estimator for estimating power of said input guidance signals over a predetermined period of time.

4. The missile-based guidance system of claim 1, further comprising detection and correlation processing means for performing signal detection and correlation functions based on calculations performed by said main channel and said dual processing path processors.

5. The missile-based guidance system of claim 1, wherein each of said at least two digital filters comprises main channel and dual processing path filters, said main channel filter for independently filtering main channel guidance signals, said dual processing path filter for filtering dual processing path guidance signals.

6. The missile-based guidance system of claim 5, wherein said main channel filter is programmable through programmable weights, and said dual processing path filter is programmable through programmable decimation.

7. In a missile-based radar guidance system comprising a multi-channel guidance signal input for inputting a missile-generated guidance signals and an analog to digital converter for digitizing said guidance signals, a system for processing said guidance signals, comprising:
   a plurality of programmable digital filters for independently filtering said digitized guidance signals;
   a dual path processor for processing said filtered guidance signals and having a serial output;
   a power estimator for estimating power of said filtered guidance signals; and
   a programmable digital threshold detector for performing calculations based on said filtered guidance signals to determine if said guidance signal power on each of said system channels is within a predetermined threshold window;
   said power estimator, said digital threshold detector and said dual path processor each performing processing functions based on common guidance signal inputs;
   said digital filters, said power estimator, said digital threshold detector and said dual path processor being implemented together in a single monolithic package.

* * * * *